UNITED STATES PATENT OFFICE.

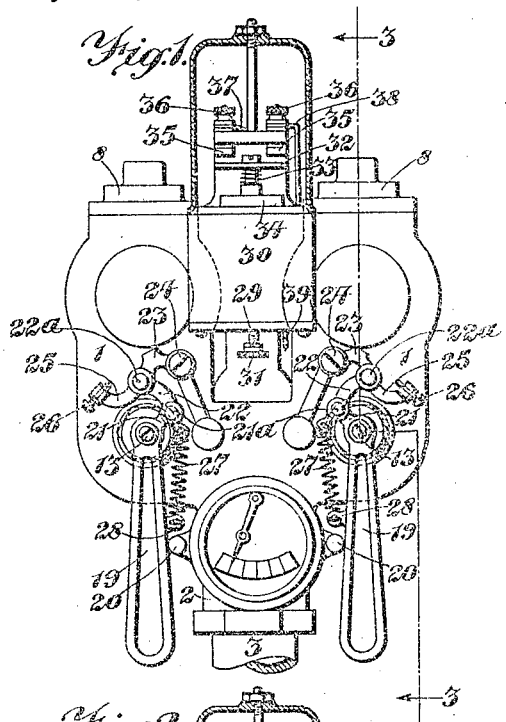

LEWIS A. MAPEL, OF ST. LOUIS, MISSOURI, ASSIGNOR TO MAPEL MANUFACTURING COMPANY, OF ST. LOUIS, MISSOURI, A CORPORATION OF MISSOURI.

VALVE MECHANISM.

1,291,987.         Specification of Letters Patent.     Patented Jan. 21, 1919.

Application filed July 11, 1917. Serial No. 179,985.

*To all whom it may concern:*

Be it known that I, LEWIS A. MAPEL, a citizen of the United States, residing at the city of St. Louis and State of Missouri, have invented a new and useful Valve Mechanism, of which the following is a specification.

This invention relates to valve mechanism. In my prior patent, No. 1,179,539, dated April 18, 1916, for fluid regulating device, I have illustrated and described an apparatus comprising a mixing chamber arranged to receive fluids simultaneously from a number of supply passages, provided with valves and devices for holding the valves open to permit continuous flow of the fluids, in combination with a normally deënergized actuator and mechanism under control of the fluids that have passed through the mixing chamber for energizing and causing the actuator to operate to release the devices holding the valves open, so that the valves will be closed automatically when a predetermined quantity of the mixed fluids has passed from the mixing chamber.

The present invention relates specifically to the devices for actuating and holding the valves open, and consists of a manipulative device for actuating each valve to open position, a series of elements coöperating with each manipulative device to retain it in position to hold the corresponding valve open, and an actuator for imparting movement to said elements to enable the manipulative devices to move automatically to position in which the valves may close. The actuator mentioned is energized by mechanism under control of the fluids that have passed from the mixing chamber, substantially as described in my co-pending application, to which I have referred.

In the accompanying drawings,

Fig. 1 is a side elevation of a fluid regulating device embodying the present invention, showing the parts in the positions which they occupy when the valves are closed.

Fig. 2 is a similar view showing the parts in the position which they occupy when the valves are open.

Fig. 3 is a sectional view on the line 3—3 of Fig. 1.

Fig. 4 is a detail view of a lever and actuating spring employed in connection with each valve.

Fig. 5 is a detail sectional view enlarged relative to the preceding views and illustrating the construction of one of the valve manipulating devices.

In the embodiment illustrated there are two supply passages 1 which converge and communicate with the mixing chamber 2 through a single opening at the upper end of said chamber. While I have illustrated two passages opening into the mixing chamber, it is entirely clear that the number of passages may be varied in conformity with the varying requirements that may have to be met. The mixed fluids pass from the mixing chamber through a passage 3 into any chosen receptacle.

Since the valves and the devices for actuating and holding them open, as applied to one passage, are duplicates of the corresponding parts for the other passage, it will be understood the description of one applies also to the other, and I have applied the same reference characters to similar parts in whatever position they may be.

Each of the passages 1 is controlled by a puppet valve 4 pressed against a valve seat 5 by a coil spring 6 of the expansion type, one end of which engages the valve and the other end of which is retained in position within an appropriate spring seat 7 above the valve. The spring seat 7 is formed within a removable member 8 closing one side of the passage 1 and provided with an extended portion 9 within which the valve 4 operates. The stem 10 extends from the under side of the valve and operates through a guide 11 in connection with the valve seat, so that the valve operating devices may engage the lower end of the stem to move the valve to open position in opposition to the power of the spring 6, thus increasing the energization of said spring so that when the valve operating devices are released the valve will be quickly closed.

A supporting member 12 is removably mounted in an opening in the wall of each of the passages 1 below the valve seats. Each of the supporting members 12 supports a rod 13 carrying a crank 14 on its inner end, the bearing of the rod being protected by packing 15 between the end of the bearing and the crank. A roller 16 is supported by the crank 14 and is arranged to engage the lower end of the valve stem 10 to raise the valve from its seat, as required to open the passages therethrough when the rod 13 is turned. The use of a roller supported eccentrically in respect of the actuating rod 13 minimizes frictional resistance and enables the valve spring 6 to assist in completing return movements of the valve opening devices and also to close the valve, in the manner and under the conditions hereinafter described. A coil spring 17 of expansion type encircles the rod 13 within the member 12 and has its inner end abutting against the member 12 and its outer end pressing against a collar 18 acting as a bushing in which the outer portion of the rod is journaled. By this arrangement it is clear that the spring 17 actuates the rod 13 outwardly and retains the crank 14 under pressure against the packing 15. A lever 19 is removably connected to the outer end of each rod and serves as a handle by which the rod may be turned to position to open the valve. When the valve is closed the lever 19 rests against an abutment 20 in connection with the mixing chamber, as illustrated in Fig. 1, and when the valve is opened the lever is approximately horizontal as illustrated in Fig. 2. Without the coöperation of additional parts the lever 19 will not remain in position to retain the valve open, but the valve will be pressed to closed position by the spring 6 causing the lever 19 to return to its position against the abutment 20.

The lever 19 has a bifurcated projection 21 between the arms of which an angular combined connecting and adjusting link is supported upon a pivot 21ª. The link mentioned includes a part 22 connecting the pivot 21ª with a pivot 22ª on one arm of a bell crank lever 23, the same being mounted on a pivot 24 in connection with the wall of the passage 1. The link 22 has an extension 25 which carries an abutment screw 26 so that when the lever 19 is raised to open the valve the inner end of the screw 26 will contact with an appropriate part of the bell crank lever to which the link is pivoted and thereby stop and prevent any additional movement of the lever 19.

A strong spring 27 of the retractile type connects the end of the link 25—25 which is below the pivot 21ª with a projection 28 on the lever 19. Thus, when the lever 19 is raised, the spring 27 is first expanded as an incident to the movement of the lower end of the link and the projecting part 28 away from each other, (that is from the positions shown in Fig. 1 toward the positions shown in Fig. 2) which expansion is increased until the three pivots 21ª, 22ª and 24 are in alinement; but when the pivots 21ª and 22ª pass beyond alined positions the spring 27 begins to retract until movement of the parts is stopped by contact of the end of the screw 26 with the arm of the lever 23. Clearly then, when the manipulative actuating devices are set in proper position to hold the valve open the spring 27 will hold them in such position. Also it is apparent that when the inner end of the lever 23 or the lever 19 is operated to a sufficient extent to move the pivot 22ª toward its starting point, out of alinement with the pivots 21ª and 24, the spring 27 will retract and actuate the lever 19 against the abutment 20, in which position the valve 4 may be completely closed by the spring 6.

As stated the valve and the controlling mechanism therefor applied to one of the passages 1 is the same as the valve and the controlling mechanism which is applied to the other passage. Thus in the embodiment shown there are two levers 23 and when said levers are raised to horizontal position, by operation of the actuating levers 19, the ends of the levers 23 are side by side and support an axially movable armature-rod 29 of an electromagnet contained within a supporting case 30. The lower end of the rod 29 is equipped with a head 31 with which the ends of the levers 23 contact to raise the rod 29 as an incident to opening the valves. The upper end of the armature rod 29 passes through a plate 32 which is yieldingly supported by a spring 33 interposed between the armature 34 and the lower side of the plate. When the armature rod is raised by operation of the valve controlling mechanism the plate 32 is moved into contact with the terminal contact members 35 connected with the binding posts 36, thus establishing an electrical connection between the binding posts. A wire 37 from a source of electrical energy is connected with one of the binding posts 36, and the other binding post is connected with the magnet by a wire 38, the other circuit wire 39 from the source of energy being connected with the magnet. Thus when the armature rod 29 is raised the circuit to the magnet is completed in so far as concerns the mechanism constituting any part of the present invention.

It is usual, however, in connection with the devices manufactured according to the disclosure of my co-pending application heretofore mentioned to employ another switch device under control of the fluids that have passed from the mixing chamber to close the normally open circuit at another point, and thus cause the magnet to be energized and the armature to be operated. When the magnet is energized thereby, causing the armature is actuated thereby, causing the rod 29 to depress the inner ends of the two levers 23 until the pivots 22ª are moved laterally beyond alined position in respect of the pivots 21ᵃ and 24, whereupon, the springs 27 act to complete the movement of the valve opening devices. This movement by the armature rod opens the circuit to the magnet by drawing the plate 32 out of contact with the contact members 35, thus deënergizing the actuating magnet as an incident to operation of the valve opening devices thereby, to enable the valves to close.

It is clear that the mechanism described may be employed in different embodiments and that there may be other variations in the construction and arrangement of the different parts and elements comprising the invention without departure from the principles and scope thereof. I do not restrict myself to specific features of construction or arrangement, but what I claim and desire to secure by Letters Patent of the United States is:—

1. The combination with a valve and an actuator for closing the valve, of a manipulative device for moving the valve to open position, a lever, a link connecting said lever with said manipulative device, and a spring connecting said link and said manipulative device and acting in one position of the latter to hold the same in position to retain the valve open and in another position thereof to enable the valve to remain closed.

2. The combination with a valve and a spring for closing it, of a device operable to move the valve to open position, a lever, a support on which said lever is pivotally mounted, a link connecting said device and said lever, an abutment on said link for stopping movement of said link and lever, and a spring connecting said link and said device and acting in one position of the latter to hold the same in position to retain the valve open, and in another position thereof to enable the valve to remain closed.

3. The combination with a valve and a spring for closing it, of a device settable in one position to hold the valve open, a lever, a support on which said lever is pivotally mounted, a link connecting said device and said lever, an abutment limiting movement of said parts when said device is operated to move the valve to open position, a spring connecting said link and said device and acting in one position of the latter to hold the same in position to retain the valve open and in another position thereof to enable the valve to remain closed, and mechanism for actuating said lever to position to enable said last-named spring to move said device to position to enable the valve to be closed by the first-named spring.

4. The combination with a valve and an actuator for closing it, of a device operable to move the valve to open position, a support, a bell crank lever pivoted upon said support, a link connecting said device and one arm of said bell crank lever, an abutment for said bell crank lever carried by said link for limiting movement of said device, a spring connecting said link and said device and acting to hold said device in position to retain the valve open when said abutment contacts with said lever and acting to move said device to position to enable said valve to be closed when said abutment is moved a sufficient distance away from said lever, and mechanism for actuating said lever to position to enable said spring to move said device to position to enable the valve to be closed.

5. The combination with a valve and a stem in connection with it, of a rod, a roller supported by said rod eccentrically in respect of the axis thereof, a handle for turning said rod and moving said roller to position to coöperate with the stem to open the valve, a lever, a link connecting said lever and said handle, a spring connecting said link and said handle, an abutment coöperating with certain of said parts to limit movement of said handle, and an actuator for moving said lever to position to enable said spring to move said parts to position to enable the valve to close.

6. The combination with a valve and a valve stem in connection therewith, of a rod, a roller supported by said rod eccentrically in respect thereof, a device for turning said rod to position to cause said roller to engage said stem and move the valve to open position, a lever, a support on which said lever is pivoted, a link pivotally connecting said lever with said rod, an actuator for imparting initial movement to said lever as required to turn said rod in a direction to enable said valve to close, and a spring connecting said link and said device for imparting the final movements to said rod as required to enable said valve to move to closed position.

7. The combination with a valve and a stem in connection with it, of a manipulative rod, a roller supported by said rod eccentrically in respect thereof and operable by said rod to engage said stem and open the valve, a lever, a link device connecting said lever with said rod, a spring coöperating with said link device to hold said rod in position to retain the valve open and arranged to operate to complete movement of the rod to position to enable the valve to close after initial movement of said rod toward such position, and means for actuating said lever to impart said initial movement to said rod.

8. The combination with a valve, an actuator for closing it and a stem in connection with said valve, of a rod, a crank on said rod, a roller on said crank arranged to engage the stem of the valve to move the valve to open position when the rod is turned, a handle for turning the rod, a lever, a link connecting said lever with said handle, a spring connecting said link and said handle, and a stop device arranged to coöperate with said link and said lever to limit movement of said handle.

9. The combination with a valve, and a spring for closing it, of a device operable to move the valve to open position, a bell crank lever, a link connecting one arm of said lever with said device, an abutment for limiting movement of said device, a spring connecting said link and said device and acting in one position of the latter to hold the same in position to retain the valve open and in another position thereof to enable the valve to remain closed.

10. The combination with a valve, and a spring for closing it, of a device settable in one position to hold the valve open, a lever for moving said device to position to hold the valve open, a bell crank lever separate from the first-named lever, a link connecting one arm of said bell crank lever with the first-named lever, an abutment for limiting movement of said levers when the first-named lever is operated to position to hold the valve open, a spring connecting said link with the first-named lever and acting in one position of the latter to hold the same in position to retain the valve open and in another position thereof to enable the valve to remain closed, and mechanism for actuating said bell crank lever to position to enable said last-named spring to move the first-named lever to position to be closed by the first-named spring.

11. The combination with a valve, and a spring for closing it, of a device movable in a direction to open the valve, a lever for operating said device, a bell crank lever separate from the first-named lever, a link connecting one arm of the bell crank lever with the first-named lever, an extension on said link, an abutment carried by said extension link, an abutment carried by said extension for limiting movement of said parts when the first-named lever is operated to move the valve to open position, a spring connecting said link and the first-named lever and acting in one position of the latter to hold the same in position to retain the valve open and in another position thereof to enable the valve to remain closed, and mechanism for actuating one of said levers to position to enable said last-named spring to move the first-named lever to enable the valve to be closed by the first-named spring.

12. The combination with a valve, and a spring for closing it, of a device operable in one direction to move the valve to open position, a bell crank lever, a link connecting one arm of said lever and said device, an adjustable abutment carried by said link limiting movement of said parts when said device is operated to move the valve to open position, a spring connecting said link and said device and acting in one position of the said device and acting in one position of the latter to hold the same in position to retain the valve open and in another position thereof to enable the valve to remain closed, and mechanism for moving said bell crank lever and thereby said device to position to enable said last-named spring to move said device to position to enable the valve to be closed by the first-named spring.

13. The combination with a valve, and a spring for closing it, of a device movable in one direction to open the valve, a bell crank lever, a link connecting said lever and said device, a spring connecting said link and said device and acting to hold the latter in position to hold the valve open and acting to impart the final movements to said device to position to enable the valve to close after an initial movement has been imparted to said device by said bell crank lever, and means for actuating said bell crank lever to impart said initial movement to said device.

In witness whereof I have signed this specification in the presence of two subscribing witnesses.

LEWIS A. MAPEL.

Witnesses:
N. G. BUTLER,
L. C. KINGSLAND.